Oct. 22, 1929.　　　　　B. GLÜER　　　　　1,732,718
DEVICE FOR CONTROLLING THE FIRING OF ORDNANCES
OR THE LIKE WHEN FIRING AT A MOVING TARGET
Filed June 18, 1925
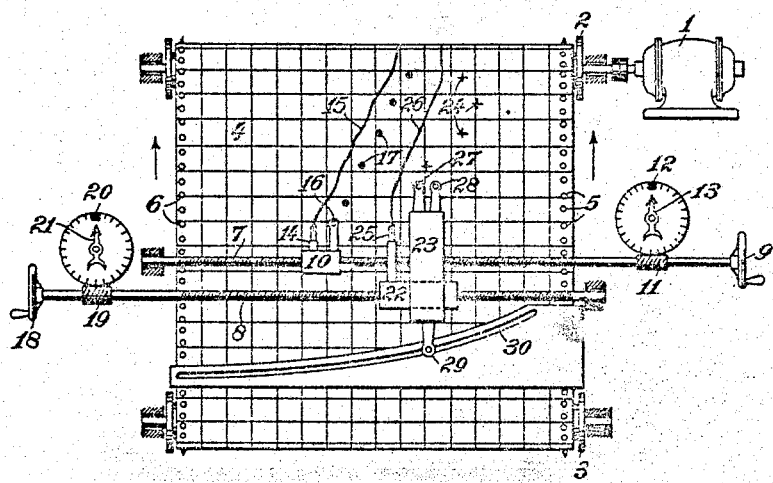
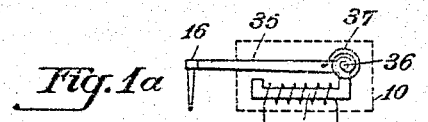
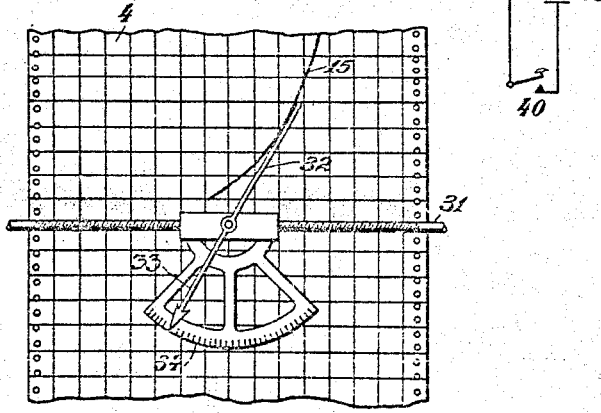

Patented Oct. 22, 1929

1,732,718

UNITED STATES PATENT OFFICE

BRUNO GLÜER, OF BERLIN, GERMANY, ASSIGNOR TO GESELLSCHAFT FÜR ELEKTRISCHE APPARATE M. B. H., OF BERLIN, GERMANY, A CORPORATION OF GERMANY

DEVICE FOR CONTROLLING THE FIRING OF ORDNANCES OR THE LIKE WHEN FIRING AT A MOVING TARGET

Application filed June 18, 1925, Serial No. 38,113, and in Germany June 20, 1924.

The present invention relates to improvements in devices for controlling the firing of ordnances or the like when firing at a moving target.

When firing at moving targets it is often desired to know not only the values measured in a certain moment or the values calculated by such measuring or values observed in a certain moment of the different firing data, as for instance range, lateral angle, approaching velocity of the target, discharge and graze observations and the like, but it may also be desirable to know the exact values of such data for a time passed. When for instance from a coast battery rapid fire is given at a remote hostile ship, it is difficult to coordinate the graze observations correctly with the corresponding shots in order to make such corrections of the ordnance adjustment as might be necessary. It may further be of importance in order to use the recorded firing data as a base for a subsequent critical examination.

A device for controlling the range measurings has already been proposed, at which a movement corresponding to the measured range is united with another regulable movement over a differential gearing whereupon the total movement obtained is recorded on a continuously moved paper band.

Such device would however not be suited for the above mentioned purpose, because the recording will give no reliable conclusion as to the really measured range.

According to the present invention a device is created which in every respect is suited for the purpose in question. With this device the data necessary for the fire control are recorded continuously or partly continuously in accordance with their real values on a continuously moved strip (a paper band or the like). This recording may be fully or partly automatic. The data which chiefly will be of interest are measured range, lateral angle, elevation angle, graze observations, firing times, at air targets also the height, etc. In order to get a clear coordination between the firing marks and the corresponding graze observations it is suitable to arrange such recording elements (recording pencils or the like) adjacent to each other, which record appertaining data. Hereby certain devices are shifted automatically in the direction in which the recording strip is moved over a distance corresponding to the individual times of flight of the projectiles. From the recorded curves the differentials in relation to the time of the individual data which are of interest for the corrections of the ordnances may easily be found. For this purpose mechanical and optical pointers or indexes are arranged, which can be adjusted in the tangent direction of the different curves.

A constructional form of the invention is shown by way of an example in the accompanying drawing.

Fig. 1 shows schematically the essential parts of the device.

Figs. 1ª and 2 show details of the same.

According to Fig. 1 a motor 1 or a clock work moves a paper strip 4 continuously at a constant speed in the direction indicated by the arrow over the rolls 2 and 3. The strip 4 is guided in a known manner by means of rows of apertures 5 and 6. Transversally to the strip 4 two threaded spindles 7 and 8 are arranged. If the spindle 7 is rotated by means of a crank 9 a nut 10 is moved axially to the spindle. Simultaneously a counter pointer 12 is turned over a worm 11. If now the main pointer 13 is adjusted continuously in accordance with the measured range by means of any conventional mechanical or electrical remote transmission system (not shown) and the counter pointer 12 is kept in registry with the main pointer 13 by means of the crank 9, the nut 10 will be moved accordingly. A recorder pin 14 or the like will then draw a curve 15 on the paper strip 4, which curve gives the true values of the measured range in accordance with the time. A further recording pin 16 will mark the discharges by means of the device shown on Fig. 1ª as will appear more fully hereinafter. This figure is a section laid perpendicularly to the axis of the spindle 7. The nut 10 is shown in dotted lines. The recording pin 16 is fixed to a lever 35, which may be turned around a shaft 36 and which when inoperative is held in horizontal position by means of a spring 37. Below the lever 35 an electromagnet 38 is arranged the windings of which are brought into connection with a battery 39, when a key or press button 40 at the operator's position is operated to close the electric circuit in which the magnet 38 is located. The latter will thereby be energized and accordingly will attract the armature-shaped lever 35 and cause the pin 16 to touch the paper 4.

Further a counter pointer 20 is, by means of a crank 18 and a worm 19, maintained in registry with a remotely controlled main pointer 21, and a nut 22 is shifted lengthwise of the threaded spindle 8. A pin or the like 25 on the nut 22 will thereby draw a curve 26 upon the paper 4, which for instance may correspond to the elevation angle at a corresponding remote adjustment of the main pointer 21. The nut 22 also carries a slide 23, which besides being movable together with the nut 22 along the spindle 8 also is shiftable in the direction in which the recorder strip 4 is moved. This latter movement is imparted to the slide 23 by means of a pin 29, which moves in a curved guide 30. This curved guide is formed in accordance with the time of flight of the projectiles dependent on the range. On the slide recording devices 27, 28 are arranged, which may be operated in the same way as the device 16 (Fig. 1ª) for recording the discharge markings. The devices 27, 28 may for instance serve for recording the graze observations for two pieces of ordnance. The shifting of the slide 23 over a distance corresponding to each period of flight will secure a clear coordination of the discharge markings 17 and the graze observation 24 to each other.

The description of the purpose and operation of the new arrangement is based upon the example thereof as illustrated in the drawing and described in the specification. It is assumed that two pieces of ordnance are being operated to fire volleys at a target and that the indicator or pointer 13 is being continuously adjusted, by means of any conventional remote transmission system, in accordance with the measured range, and that the indicator 21 is being operated in a corresponding manner by means of a suitable remote control.

Under such conditions, by maintaining the indicators 12 and 20 in registry respectively with the pointers 13 and 21, by means of the manually operated cranks 9 and 18, the nuts 10 and 22 will be adjusted lengthwise of the spindles 7 and 8 respectively, in such a manner that the recording devices 14 and 25 will be caused to continuously record the indicated range and the elevation angle and to produce respectively the curves 15 and 26. The recording devices 27 and 28 partake of the above mentioned adjustments of the nuts 10 and 22, without however producing any records upon the paper 4. In addition, as the nut 22 is shifted lengthwise of the spindle 8 in the indicated manner, the slide 23 will be shifted relatively thereto by the action of the curved guide 30 upon the pin 29, and accordingly will adjust the devices 27 and 28 in the direction of travel of the paper strip 4. At the moments when both pieces of ordnance are simultaneously discharged, the button 40 is operated to close the electric circuit and to thereby bring about an electrical energization of the magnet 38; as this occurs the lever 35 will be attracted by said magnet and the recording pin 16 will accordingly be caused to make a mark 17 upon the paper strip 4.

The results of the two shots are observed and if the target has been hit, the devices 27 and 28 or either of them are caused to make a mark or marks 24 upon the paper strip 4, it being understood that the operation of the devices 27 and 28 may be controlled by arrangements similar to that shown in Fig. 1ª for the control of the device 16. In the illustrated example, the device 27 may relate for instance to the first gun of the battery and the device 28 to the second gun thereof. By means of the curved guide 30 and the pin 29 the devices 27 and 28 are so adjusted that those marks 17 and 24 which indicate the discharge of and a hit by the same gun, are positioned in transverse alignment with each other upon the paper 4.

In Fig. 1 the marks 24 which designate the hits, by comparison with the discharge indicating marks 17 show the following results: With the first volley, reading from the top of Fig. 1 downwardly, the first gun has hit the target and the second one has not. With the second and third volleys the second gun has hit the target both times and the first gun, both times, has not, while with the fourth volley the first gun has hit the target and the second gun has not. The production of the marks 17 and 24 is controlled from a suitable observation point, for instance, by means of the arrangements such as illustrated diagrammatically in Fig. 1ª. A comparison of the marks 17, the marks 24 and the curves 15 and 26, with each other makes it easily possible for the officer directing the firing to impart adequate direction to the operators of the guns which miss the target, to enable corrections to be made, and for example, in the case of a gun which in spite of all proper corrections still misses the target, makes it possible to positively determine the existence of defects therein.

The invention naturally is not restricted to the example illustrated. For example, instead of an individual recording mechanism for the observation of the hits of each gun, a plurality of recording devices may be provided, one or the other of which may be operated according to the position of the hit upon the target. In such case a hit may be indicated on the curve 26 which designates the angle of elevation, a shot which lands in front of the target, may be placed to the left of the curve 26 and a shot which drops behind the target may, for instance, be placed to the right of said curve 26. The record marks upon the paper 4 may serve also as a valuable basis for a subsequent criticism of the shooting.

Fig. 2 shows as an addition to the device of Fig. 1 a double pointer 32, 33, which is shiftably located on a spindle 31 arranged transversely to the paper strip 4. The arrangement shown in Fig. 2 serves to ascertain the direction of the tangents at predetermined points of the curves 15 or 26. If the indicator 32 is set successively to any predetermined points of the range curve 15, in the direction of the tangent thereof, the rearwardly projecting extension 33 of the indicator 32 will show on the scale 34 any diversion in the target range which may have occurred at the time; that is, the extent to which the range, in the interval between given settings of the indicator 32, has changed will be positively indicated on said scale. The same is true in connection with the curve 26 to determine any changes in elevation angles in given intervals of time.

In the same manner as shown in Fig. 1 also all other values may be registered which are of importance for the criticism of the firing. All values may, if desired, be recorded on the same recording strip.

What I claim as my invention and desire to secure by Letters Patent is:—

1. In a recording apparatus for artillery fire comprising a travelling web of material moving at a constant speed, and duplex recording means for producing a continuous line on said web to indicate the firing range, and for producing individual marks adjacent to said line to indicate gun discharges, the combination of a marking device for recording target hits upon said web; a carrier, a slide carrying said marking device mounted on said carrier and movable in the direction of travel of said web, and a slotted member whereby said slide is actuated to cause said marking device to produce its marks on said web in spaced transverse alignment with the individual marks relating to the same firing operation as made by said duplex recording means.

2. In a recording apparatus for artillery fire comprising a travelling web of material moving at a constant speed, duplex recording means for producing a continuous line on said web to indicate the firing range, and for producing individual marks adjacent to said line to indicate gun discharges, a threaded spindle rotatably disposed transversally to the direction of movement of said web, a carriage mounted on said spindle and movable thereby across said web, and a marking element on said carriage for producing a continuous line on said web to indicate elevation angles, the combination of a slide mounted on said carriage and movable therewith across said web and movable relatively to said carriage in the direction of travel of said web, a marking element carried by said slide for producing independent marks on said web to indicate target hits, and a curved guide connected with said slide whereby the latter is slidably actuated to cause said last named marking element to produce its marks on said web in spaced transverse alignment with individual marks relating to the same firing operation as made by the duplex recording means.

3. In a recording apparatus for artillery fire, comprising a travelling web of material moving at a constant speed and adapted to have records produced thereon, and a first marking element for producing individual marks on said web coincidentally with gun discharges, the combination of a second marking element for producing individual marks on said web indicating target hits, a device provided with a curved slot corresponding to the time of flight of the projectiles dependent upon the firing range, and a mechanical connection between said slotted device and the second marking element whereby the markings produced by the first and second marking elements with respect to a given firing operation will be located in spaced adjacent relation to each other upon said web.

4. In a recording apparatus for artillery fire, comprising a travelling web of material moving at a constant speed and adapted to have records produced thereon, and a first marking element for producing individual marks on said web coincidentally with gun discharges, the combination of a second marking element for producing individual marks on said web indicating target hits, a device provided with a curved slot corresponding to the time of flight of the projectiles dependent upon the firing range, a mechanical connection between said slotted device and the second marking element whereby the markings produced by the first and second marking elements with respect to a given firing operation will be located in spaced adjacent relation to each other upon said web, and a third marking element movable across said web for producing thereon a continuous curve corresponding to an adjustment value of the artillery.

In testimony whereof I affix my signature.

BRUNO GLÜER.